May 2, 1950 — J. C. COLUMBUS — 2,506,013
FILTER FOR COFFEE MAKERS
Filed Dec. 4, 1946 — 3 Sheets-Sheet 1
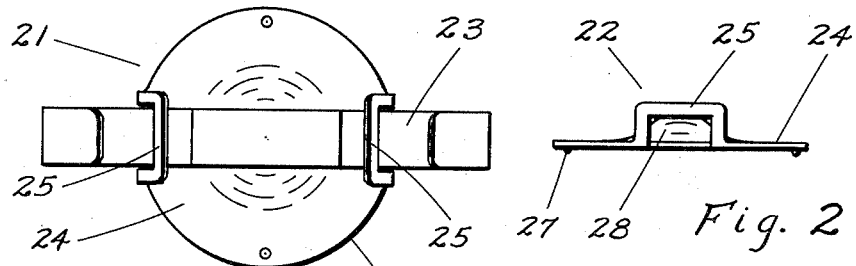
Fig. 1
Fig. 2
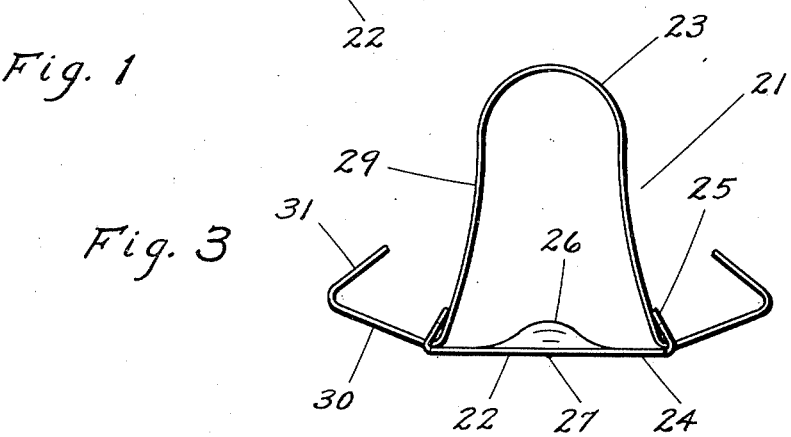
Fig. 3
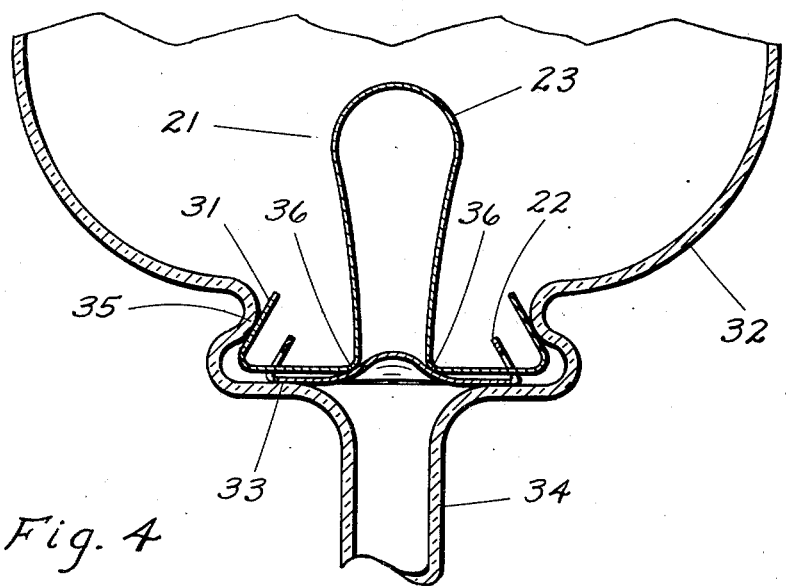
Fig. 4
Inventor:
John C. Columbus

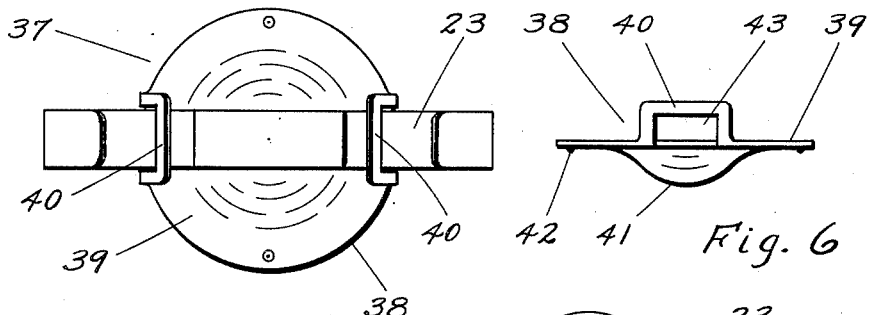
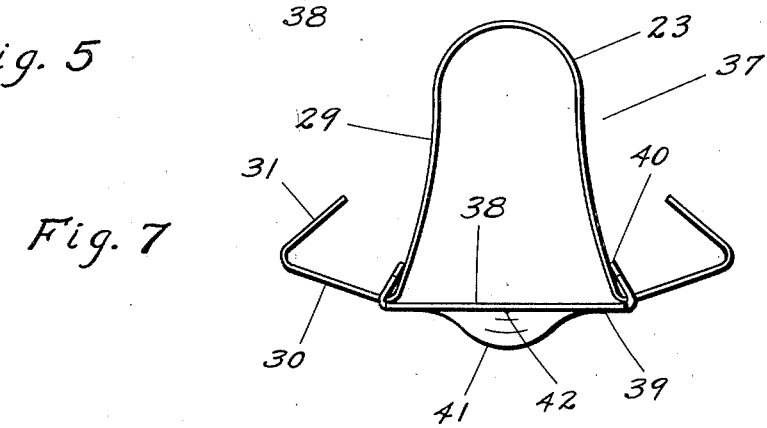
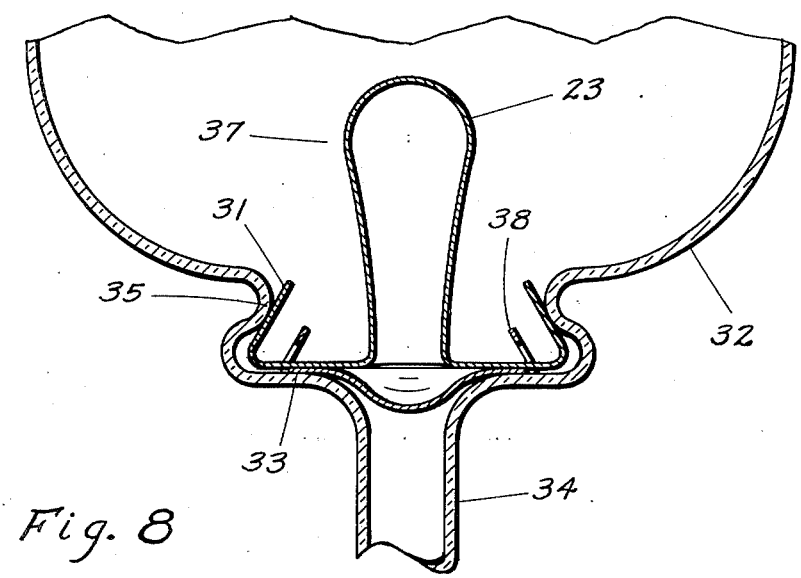

May 2, 1950  J. C. COLUMBUS  2,506,013
FILTER FOR COFFEE MAKERS
Filed Dec. 4, 1946  3 Sheets—Sheet 3

Inventor:
John C. Columbus

Patented May 2, 1950

2,506,013

UNITED STATES PATENT OFFICE 2,506,013

FILTER FOR COFFEE MAKERS

John C. Columbus, Ferguson, Mo.

Application December 4, 1946, Serial No. 713,939

12 Claims. (Cl. 210—162)

This invention relates to filter members and retaining means for same for use in coffee makers generally, and more particularly for use in coffee makers of the pressure-vacuum type.

In coffee makers of the pressure-vacuum type it is necessary to use some mechanical means for retaining the filter member in place except in the specific instance where the filter member is comparatively heavy and is retained by gravity. It is highly desirable, particularly from the standpoint of public use, that such mechanical retaining means be simple in construction and easy to install and remove, and that the associated filter member be simple in construction and easy to clean. It is also desirable from the standpoint of manufacturing cost that both items be simple in construction and adaptable to manufacture by few and simple operations.

In the case of filter members, such members of the imperforate type which provide restricted filtering passages between themselves and the container in which they are installed have generally been found very desirable for coffee makers of the pressure-vacuum type. Certain filter members of this type depend upon a roughened surface thereon in cooperation with a seat in the container therefor to provide innumerable minute filtering passages. This arrangement, however, tends to greatly limit the total amount of filtering space obtainable with a given seating diameter. A filtering passage equally efficacious and providing greater total filtering space, and hence faster filtering action, may be obtained by providing an imperforate filter member with relatively few minute projections thereon which in cooperation with its seat establish a restricted filtering passage. A still simpler arrangement that is highly effective in glass coffee makers is to provide a plain filter member, the restricted filtering passage being formed between the member and its seat by virtue of the irregularities inherent in glassware as manufactured which prevents the perfect seating of the filter member.

In connection with filters of various types for use in coffee makers, it should be noted that, in the past, filters made of glass or ceramic material have generally been favored due to the inert characteristics of such materials with respect to coffee and infusions thereof. However, stainless steel, alone of the common metals, has also been found to be inert with respect to coffee and infusions thereof, showing no discoloration or other evidences of chemical action thereupon after extended exposure to the hot beverage and grounds. The devices described herein are particularly adaptable to construction from this latter material at a decided saving in cost in addition to other advantages.

An object of my invention is to provide a retainer for a coffee-maker filter which is simple in form, easy and cheap to manufacture, and easy to install in and remove from a coffee maker.

Another object of my invention is to provide a filter member for a coffee maker which is simple in form, easy and cheap to manufacture, and easy to clean.

Another object of my invention is to provide a filter member for a coffee maker and a retainer for same combined in an assembly which is simple, easy to manufacture and assemble, easy to clean, and easy to install in and remove from a coffee maker.

Another object of my invention is to provide a filter member for a coffee maker and a retainer for same which are both adaptable to manufacture from stainless steel.

Other objects and advantages of my invention will be apparent from the drawings and description.

A preferred form and two other forms of my invention are illustrated in the accompanying drawings. In these drawings:

Figure 1 is a plan view of the preferred form of my invention;

Figure 2 is a view showing in elevation the filter member only of the device illustrated in Figure 1;

Figure 3 is a view showing in elevation the device otherwise illustrated in Figure 1;

Figure 4 is a view showing in central vertical section the device of Figures 1 and 3 installed in the upper container of a pressure-vacuum type coffee maker;

Figure 5 is a plan view of another form of my invention;

Figure 6 is a view showing in elevation the filter member only of the device illustrated in Figure 5;

Figure 7 is a view showing in elevation the device otherwise illustrated in Figure 5;

Figure 8 is a view showing in central vertical section the device of Figures 5 and 7 installed in the upper container of a pressure-vacuum type coffee maker;

Figure 9:
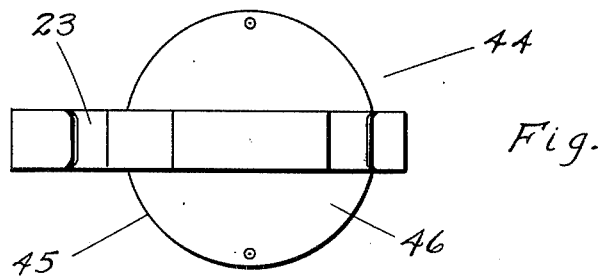
Figure 9 is a plan view of still another form of my invention.

Referring to Figures 1, 2, 3 and 4, the preferred form of filter assembly 21 consists of a filter member 22 and a retainer 23. The filter member 22 is preferably formed from stainless steel sheet approximately .010 to .015 inch thick and comprises an annular discoidal portion 24, two lugs 25 which extend upward and inward from the rim of the discoidal portion at diametrically opposite points, a dome-like portion 26 within the discoidal portion, and two projections 27 which extend downward a few thousandths of an inch from the lower surface of the discoidal portion. The projections 27 are usually desirable but are not essential in all cases, as will be explained hereafter. A rectangular passage 28 is provided in each lug 25.

The retainer 23 is preferably formed from stainless steel strip approximately .015 to .020 inch thick and approximately .400 to .500 inch wide, and comprises an upper central portion 29 of inverted U-like shape, two lower intermediate portions 30 which extend outward and approximately at right angles from the lower extremities of the legs of the central portion, and two end portions 31 which extend upward and inward from the outer extremities of the intermediate portions at approximately 60° angles thereto. In forming the retainer, the bends are all made about axes which are substantially normal to a plane which is, in turn, substantially normal to the major axis of the cross section of the material so that in one aspect the various portions of the retainer lie substantially in a plane as shown in Figure 1.

The filter member 22 and the retainer 23 are loosely assembled together by the intermediate portions 30 of the retainer passing through the rectangular passages 28 in the lugs of the filter member, as shown in Figures 1 and 3. The rectangular passages 28 are made slightly wider than the retainer material and about half as high as wide, and thus permit free movement inward and outward of the intermediate portions 30 through same, but restrict to a reasonable degree the sidewise rotational movement of the retainer 23 with respect to the filter member 22. The height of the rectangular passages 28 must be sufficient to permit proper cooperation of the retainer 23 with the dome-like portion 26, as explained hereafter. If desired, a centrally-located passage, less in width than the retainer, may be provided through the top of each lug into the otherwise rectangular passage, thus dividing the single solid top portion into two opposing ears. The central portion 29 of the retainer is preformed so that the legs thereof spread outward somewhat more than shown in Figure 3 so that, when the retainer 23 and the filter member 22 are assembled as shown, the legs of the central portion 29 bear lightly against the lugs 25 and thus maintain the assembly in a stable condition when same is not installed in a coffee maker. It will be noted that at least one end portion 31 must be left unformed until the retainer and the filter member have been assembled. Actually, the most efficient manufacturing procedure has been found to consist of completely forming the filter member 22, but first forming only the central portion 29 of the retainer, then passing the legs of the inverted U thus formed through the rectangular passages 28 in the lugs and forming the intermediate and end portions below the filter member, and finally withdrawing the legs upward through the rectangular passages until the retainer snaps into the position shown in Figure 3. The proper angular setting of the lugs 25 and the flexibility of the retainer material will permit forming by this procedure.

Figure 4 illustrates the filter assembly 21 installed in a glass upper container 32 of a pressure-vacuum type coffee maker which is adapted thereto. A seat 33 is provided in the upper container 32 above the tubular portion 34 to cooperate with the annular discoidal portion 24 of the filter member and the projections 27 thereon, and an annular shoulder 35 is provided above the seat to cooperate with the end portions 31. The relative proportions should be more or less as shown for optimum operation, but are not critical. In fact, a particular feature of this filter assembly is its ability to function properly in upper containers having wide variations in the diameter of the annular shoulder 35. The cooperation of the retainer 23 with the dome-like portion 26 of the filter member at the points 36 provides means which automatically centers the filter member in the upper container 32, as shown in Figure 4, and also increases the retaining force against the filter member as explained hereafter.

The filtering passage is formed between the annular discoidal portion 24 and the seat 33. Due to irregularities in manufacture, particularly of glassware, the projections 27 on the lower surface of the discoidal portion 24 are not always essential to the formation of the filtering passage, the imperfect fit of the discoidal portion with the seat 33 usually being sufficient to provide the necessary restricted passage. However, best results are usually obtained by providing two projections 27 located on a diameter of the filter member approximately normal to the centerline of the lugs 25. With this arrangement, the retainer tends to distort and seat the filter member at the lugs, the projections thus establishing the maximum filtering passage at and near their locations. Projecting points as shown are usually preferable but obviously radial ridges or some similar equivalent arrangement could be employed instead. Also, where the seat 33 is true and well formed a greater number of projections may be advantageously employed.

The second form of filter assembly 37, as illustrated in Figures 5, 7 and 8, and in part in Figure 6, is but slightly different in construction from the preferred form, having the same retainer 23 but a different filter member 38. This filter member comprises an annular discoidal portion 39, lugs 40 with rectangular passages 43 therethrough, and projections 42, all similar to the corresponding portions of the filter member 22. A bowl-like portion 41 is however located within the annular discoidal portion 39 instead of the dome-like portion present in the preferred form. The retainer 23 and the filter member 38 are assembled in the same manner as in the preferred form. When installed in the upper container 32 of a pressure-vacuum type of coffee maker, as illustrated in Figure 8, the filter member 38 is centered approximately by the projection of the bowl-like portion 41 into the tubular portion 34 of the upper container. It will be noted that in this arrangement the intermediate portions 30 of the retainer bear directly upon the annular discoidal portion 39 of the filter member.

Figure 10:
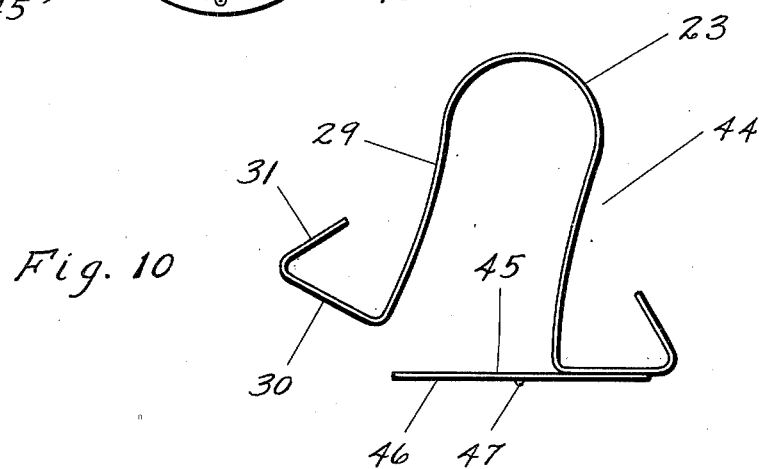
Figure 10 is a view showing in elevation the device otherwise illustrated in Figure 9.
Figure 11:
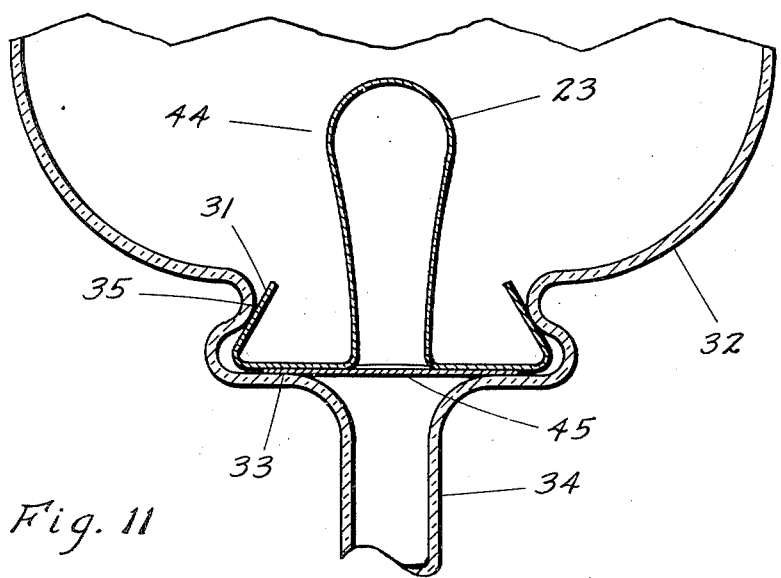
Figure 11 is a view showing in central vertical section the device of Figures 9 and 10 installed in the upper container of a pressure-vacuum type coffee maker.

The third form of filter assembly 44, as illustrated in Figures 9, 10 and 11, comprises the same retainer 23 as used in the two other forms in combination with a different filter member 45. In this arrangement, the filter member is extremely simple, comprising only a discoidal portion 46 with projections 47 similar to the projections on the other filter members, the assembly being effected by one of the intermediate portions 30 of the retainer being affixed, preferably by means of electrical resistance welding, to the upper surface of the discoidal portion as shown in Figure 10. The components are positioned before permanent assembly so that the filter member 45 will be substantially centered in the upper container 32 when the filter assembly is installed therein as shown in Figure 11. While this filter assembly is the simplest of the three, it is least adaptable to wide variations in the diameter of the annular shoulder 35, having no self-centering properties except for one fixed shoulder diameter.

The retainer 23, while being peculiarly well adapted to the filters shown, may also be used with other forms of filters; and it is not essential that the retainer and associated filter member be assembled together, either loosely or rigidly. The filter members 22, 38 and 45, although shown and described as imperforate in their preferred forms, may if desired be foraminous to provide filtration therethrough. Also, except in the case of a welded filter assembly such as shown in Figure 10, the filter members may be of glass, plastic or ceramic material.

Before proceeding with a detailed discussion of the operation of the various filter assemblies, it is deemed advisable to set forth the fundamental principles upon which the retainer common to all is based. In addition to the various desirable features of the filter members, which should be apparent to one skilled in the art, and the novel and efficient combinations of same with the common retainer, the retainer itself incorporates three basic principles which may not be quite so evident.

One principle embodied in the retainer 23 is the development by a resilient member, when deflected and restrained, of force against the restraining means. This force may be considered for all practical purposes as varying in direct proportion to the amount of deflection produced in the resilient member when so restrained. A second principle embodied in the retainer is the resolution of the developed force due to the deflection and restraint of the resilient member into components acting in other directions by angular disposition of the primary restraining means and the cooperating portions of the resilient member. A third principle embodied in the retainer is the relationship of forces exerted by a resilient member in various restrained positions with variations in the distance through which the deflection of same takes place.

Thus, when the retainer 23 is installed, in connection with a filter member, in the upper container 32 of a coffee maker, as for instance in Figure 8, the mere restraint of the deflected retainer by the annular shoulder 35 results in the development of two equal and opposite forces which act generally outward against the shoulder. However, due to the angular disposition of the end portions 31 of the retainer and the approximately circular cross-sectional shape of the cooperating portions of the shoulder 35, the elemental outwardly-acting force exerted by each half of the retainer due to the deflection and restraint of the retainer is resolved into two components, one acting outward at the point of contact of each end portion with the shoulder and normal to each end portion, the other acting directly downward against the filter member at the point or area of contact of each intermediate portion 30 therewith. In the particular retainer illustrated, the end portions 31 are disposed at approximately 30° to the vertical when the retainer is installed and therefore the forces against the shoulder act outward and upward at approximately 30° to the horizontal. This results in the development of downwardly-acting force components against a filter member having a flat horizontal contacting surface, such as filter members 38 and 45, each equal to about half the intensity of each force acting outwardly and upwardly against the shoulder. To provide a margin of safety, the total downwardly-acting force against such a filter member should be greater than that theoretically required and normally should be about 8 ounces, and thus each end portion, when formed to function at 30° to the vertical, should exert a minimum force of about 8 ounces against the shoulder 35. Certain minor geometrical details such as the shape of the upper central portion of the retainer may modify these values slightly, but for all practical purposes these effects may be ignored. However, in the case of filter member 22, the fundamental downwardly-acting forces are augmented by forces developed as a result of the angular cooperation of the retainer with the dome-like central portion, as will be explained hereafter. The third principle is utilized in the retainer to obtain comparatively small changes in the outwardly-acting forces with given changes in the restrained position by providing the elongated inverted U-shaped central portion. With this arrangement, the retainer when restrained is deflected through a characteristic distance which is defined as the distance from the point of contact of each end portion 31 with the shoulder 35 to the apex of the central portion 29. For a given retainer material and a particular cross section and preformed shape, the magnitude of this distance determines the magnitude of the outwardly-acting forces developed by a given amount of deflection and the percentage increase or decrease in these forces as the end portions are moved inward or outward a given amount. For such a given amount of inward or outward movement, the change in forces thus produced is inversely proportional to the cube of the characteristic distance through which the deflection takes place. The upward extension of the inverted U-shaped central portion 29 with respect to the remainder of the retainer may thus be considered a fair measure of its flexibility, and when made somewhere near the proportions shown provides a retainer which develops the necessary retaining forces and is also easy to install and remove. As an example, consider a filter assembly of the arrangement and proportions illustrated in Figures 5, 6 and 7, and having an overall height of approximately 2.25 inches. In this instance, with the retainer 23 made of .015 by .450 inch stainless steel strip and preformed to exert an outward pressure of about 1 ounce against each of the lugs 40, a squeeze of approximately 12 ounces applied inward about one-third the way up each leg of the central portion 29 is required to compress the retainer sufficiently to permit the installation of the filter assembly 37 in the upper container 32 of a coffee maker as shown in Figure 8, and, when released, each of the end portions 31 exerts a pressure of approximately 8 ounces outwardly and upwardly against the annular shoulder 35. Since each of the end portions 31 as restrained makes, in this case, an angle of approximately 30° with the vertical, the resulting force component directed downward from each half of the retainer 23 against the filter member 38 is approximately 4 ounces, thus providing a total downwardly-acting force of approximately 8 ounces against the filter member. The force and deflection characteristics of the example cited are approximately linear, as predicted by the governing law, and average approximately .06 inch per ounce for each half of the retainer at the contact zone of each end portion 31. A slight departure from linearity is present, due to the change in the characteristic shape under compression. A squeeze of approximately 16 ounces, applied to each leg of the central portion 29 as noted, is sufficient to completely compress the retainer 23 so that the lower extremities of the legs meet. It should be noted here that another particular advantage secured by the provision of the inverted U-like central portion is the utilization of same also as a handle for installing and removing the filter assembly.

When the filter assembly of Figures 1 and 3 is installed as shown in Figure 4, the resulting forces which normally would act directly downward against the filter member are in this case applied at an angle to the surface of the dome-like portion 26 at the points of contact 36. In the example shown, the slope of the surface of the dome-like portion at each point 36 is approximately 30° to the horizontal. The cooperation of the retainer with the shoulder 35 and the dome-like portion 26 at different angles increases the outwardly-acting forces against the shoulder which, in turn, further increase the downwardly-acting forces against the filter member. These interacting forces thus mutually augment each other to provide a greater ultimate total downwardly-acting force against the filter member, the increase being mathematically in the nature of a converging exponential series, and in this case and at the angles noted the ultimate total downwardly-acting force against the filter member 22 is approximately 50 percent greater for a given fundamental retainer pressure against the shoulder 35 than the downwardly-acting force exerted against a flat filter surface as in Figures 8 and 11. Therefore, if desired, the retainer for the dome type of filter may be made of lighter material or formed to exert less pressure against the restraining shoulder to provide a given downwardly-acting force against the filter member. In the examples shown, a retainer exerting a fundamental outwardly-acting force of 8 ounces by each end portion 31 against the shoulder 35 provides an ultimate total downwardly-acting force against the filter member of approximately 12 ounces for filter assembly 21 and approximately 8 ounces for filter assemblies 37 and 44.

The operation of the preferred form of filter assembly 21, as illustrated in Figures 1 and 3, is as follows:

The legs of the central portion 29 of the retainer 23 are squeezed together sufficiently for the end portions 31 to be placed within the annular shoulder 35 of the upper container 32, the filter member 22 placed down upon the seat 33, and the legs then released to allow the end portions to spring back outward and bear against the shoulder as shown in Figure 4. The retainer 23 centers itself substantially in the container 32, and by means of the lugs 25 centers the filter member 22 along their axis. The cooperation of the retainer with the dome-like portion 26 at the points 36 centers the filter member transversely as shown. The end portions 31, each bearing against the annular shoulder 35 with a fundamental outwardly-acting force of, say, 8 ounces provides a total downwardly-acting force of approximately 12 ounces against the filter member 22. The projections 27 establish between the annular discoidal portion 24 of the filter member and the seat 33 a filtering passage corresponding to their height at their locations, but normally decreasing and possibly disappearing entirely under the lugs 25 due to the distortion of the discoidal portion by the downwardly-acting forces. This action insures that the filtering passage formed will not exceed a desired maximum opening except in rare cases where the seat is very uneven.

During the pressure phase of operation of a pressure-vacuum type coffee maker containing the upper container with the installed filter assembly, the water may be forced upward through the tubular portion 34 quite rapidly and under considerable pressure. In such cases, when the upwardly-acting pressure overcomes the downwardly-acting force of the retainer 23, the filter member 22 is displaced upward slightly from its seated position to permit less restricted passage of the water and any vapor or steam that may be present and thereby relieve the upwardly-acting pressure. In this action, the end portions 31 are simply forced to slide upward slightly at their respective angles against the annular shoulder 35, the central portion of the retainer being thereby compressed a slight additional amount. As the displacing pressure subsides, the end portions 31 move back downward along their respective angles to reseat the filter member 22. It should be noted that a very desirable feature of filter assemblies having this type of retainer is the fact that, by virtue of the substantially constant angular cooperation of the end portions of the retainer with the annular shoulder of the upper container and the deflection characteristics of the central portion of the retainer, a substantially constant downwardly-acting force is exerted against the filter member both when seated and when displaced upward from its seat.

During the vacuum phase of operation of the coffee maker, the infusion effected in the upper container is drawn through the restricted filtering passage between the annular discoidal portion 24 of the filter member and the seat 33, substantially all of the grounds being thereby strained therefrom.

The filter assembly may be removed easily either by squeezing the retainer and withdrawing same, or by simply placing a finger in the inverted U-shaped central portion and pulling upward.

The filter assemblies 37 and 44 operate in the same manner as filter assembly 21, with the exception of the filter centering action. The bowl-like portion 41 centers filter member 38 of the filter assembly 37 by extending downward into the tubular portion 34 of the upper container 32, as shown in Figure 8. The filter member 45 of filter assembly 44 is centered in the upper container 32 by being affixed to the retainer 23 which is itself self-centering.

It will be understood that forms of filter retainers and filter members, and combinations thereof, other than those illustrated may be devised without departing from the spirit of my invention, and the exclusive use of all such embodiments and modifications within the scope of the appended claims is contemplated.

I claim:

1. In a liquid-filtering device comprising a filter member seated in a container having an inwardly projecting annular shoulder above the seat for said filter member, a retainer for said filter member formed of a length of resilient material and comprising an upper central portion of inverted U-like shape, two lower intermediate portions extending outward respectively from the lower extremities of said central portion and being adapted to bear downwardly against said filter member, and two substantially straight end portions extending upward and inward from the respective outer extremities of said intermediate portions to bear upwardly and outwardly against said shoulder.

2. In a liquid-filtering device comprising a filter member seated in a container having an inwardly projecting annular shoulder above the seat for said filter member, a retainer for said filter member composed of a strip of resilient material of substantially rectangular cross section, formed substantially in a single plane about axes which are substantially parallel to the major axis of said cross section, and comprising an upper central portion of inverted U-like shape, two lower intermediate portions extending outward respectively from the lower extremities of said central portion and being adapted to bear downwardly against said filter member, and two substantially straight end portions extending upward and inward from the respective outer extremities of said intermediate portions to bear upwardly and outwardly against said shoulder.

3. In a liquid-filtering device comprising a container having a seat for a filter member and an inwardly projecting annular shoulder above said seat, a filter assembly comprising a filter member and a retainer therefor; said filter member being adapted to seat in said container and having circumferentially disposed lugs extending upward from the upper surface thereof, each one of said lugs having a radially extending passage therethrough; said retainer being formed of resilient material and comprising portions disposed radially outward of the respective lugs and adapted to bear upwardly and outwardly against said shoulder, and other portions extending inwardly from the portions disposed outward of said lugs, being adapted to bear downward against said filter member, and passing freely through the respective passages in said lugs to loosely assemble said retainer with said filter member and to permit the portions of said retainer disposed outward of said lugs to move inward and outward as required with respect to said filter member.

4. In a device for making infusions of coffee, tea or the like, comprising a container having a seat for a filter member and an inwardly projecting annular shoulder above said seat, a filter assembly comprising a filter member and a retainer therefor; said filter member being adapted to seat in said container and comprising at the top thereof a centrally located dome-like portion and two lugs extending upward at points diametrically opposite with respect to said dome-like portion, each one of said lugs having a radially extending passage therethrough; said retainer being formed of a length of resilient material and comprising an upper central portion of inverted U-like shape, two lower intermediate portions extending outward respectively from the lower extremities of said central portion, being adapted to bear downwardly against said dome-like portion at points outward of the center thereof, and passing freely through the respective passages in said lugs, and two end portions extending upward and inward from the respective outer extremities of said intermediate portions to bear upwardly and outwardly against said shoulder.

5. In a device for making infusions of coffee, tea or the like, comprising a container having a downwardly extending tubular portion, an internal annular seat for a filter member above said tubular portion and about the opening therein, and an inwardly projecting annular shoulder above said seat, a filter assembly comprising a filter member and a retainer therefor; said filter member being adapted to seat in said container, having on the bottom thereof a downwardly extending portion adapted to fit loosely within the top of said tubular portion to center said filter approximately, and having on the top thereof two lugs extending upward at diametrically opposite points, each one of said lugs having a radially extending passage therethrough; said retainer being formed of a length of resilient material and comprising two oppositely disposed outer portions adapted to bear upwardly and outwardly against said shoulder, and two other portions extending inwardly from said outer portions, being adapted to bear downward against said filter member, and passing freely through the respective passages in said lugs to loosely assemble said retainer with said filter member and to permit said oppositely disposed outer portions to move inward and outward as required with respect to said filter member.

6. In a device for making infusions of coffee, tea or the like, comprising a container having a seat for a filter member and an inwardly projecting annular shoulder above said seat, a filter assembly comprising a filter member and a retainer therefor; said filter member being adapted to seat in said container; said retainer being formed of a length of resilient material and comprising an upper central portion of inverted U-like shape and, at the ends thereof and oppositely disposed, two outer portions adapted to bear upwardly and outwardly against said shoulder and two inner portions adapted to bear downwardly against said filter member, one of said inner portions being affixed to said filter member.

7. A filter retainer for use in a liquid-filtering device, said retainer being formed from a flat strip of resilient material about transverse flatwise axes, and comprising a central portion of U-like shape, two intermediate portions extending outward respectively from the extremities of said central portion, and two substantially straight end portions reflexed respectively from the outer extremities of said intermediate portions toward said central portion to the extent that, in the deflected and restrained operative position of said retainer, the said end portions will be inclined inward beyond mutually parallel attitudes.

8. A filter assembly for use in a beverage making device comprising a filter member and a retainer therefor; said retainer being formed from a flat strip of resilient material about transverse flatwise axes, and comprising an upper central portion of inverted U-like shape, and two lower portions extending respectively and oppositely from the extremities of said central portion; said filter member having at the top thereof oppositely disposed and upwardly extending lugs adapted to loosely encompass the said lower portions of the retainer, the said retainer thus being loosely assembled with said filter member whereby the said lower portions can be moved inward and outward as required with respect to said filter member.

9. A filter assembly for use in a beverage-making device comprising a filter member and a retainer therefor; said retainer being formed from a flat strip of resilient material about transverse flatwise axes, and comprising an upper central portion of inverted U-like shape and two outwardly extending portions at the extremities of said central portion; said filter member having a central dome-like portion and at opposite sides thereof means loosely encompassing said outwardly extending portions to permit free inward and outward movement of same and to loosely assemble said retainer with said filter; the said retainer and said filter member being adapted whereby, in the operative configuration of said filter assembly, the angular junctures of said outwardly extending portions with said central portion will cooperate with said dome-like portion at points oppositely outward of the center thereof.

10. A filter assembly for use in a beverage-making device consisting of a filter member and a retainer therefor; said filter member comprising on its upper surface an annular flat portion, two lugs extending upward therefrom at diametrically opposite points, each one of said lugs having a radially extending passage therethrough, and a dome-like portion within said annular flat portion and projecting upward therefrom; said retainer being formed from a strip of resilient material about transverse flatwise axes, and comprising an upper central portion of verted U-like shape, two lower intermediate portions extending outward respectively from the lower extremities of said central portion and passing freely through the respective passages in said lugs, and two end portions reflexed respectively from the outer extremities of said intermediate portions toward said central portion; the said retainer and said filter member being adapted whereby, in the operative configuration of said filter assembly, the said end portions will extend upward and inward and the said intermediate portions will cooperate with the upper surface of said filter member at points oppositely outward of the center of said dome-like portion.

11. A filter assembly for use in a beverage-making device comprising a filter member and a retainer therefor; said retainer being formed of a length of resilient material, and comprising an upper central portion of inverted U-like shape, and, extending respectively and oppositely from the extremities thereof, two lower portions adapted to cooperate, when in operative position, with the upper surface of said filter member, one of said lower portions being affixed in operative position to said filter member.

12. A filter assembly for use in a beverage-making device consisting of a filter member and a retainer therefor; said retainer being formed of a length of resilient material, and comprising an upper central portion of inverted U-like shape, two lower intermediate portions extending outward respectively from the lower extremities of said central portion and being adapted to cooperate, when in operative position, with the upper surface of said filter member, and, reflexed respectively from the outer extremities of said intermediate portions toward said central portion, two end portions which, in the deflected and restrained operative configuration of said retainer, will extend upward and inward; one of said intermediate portions being affixed in operative position to said filter member.

JOHN C. COLUMBUS.

REFERENCES CITED

The following references are of record in the file of this patent:

UNITED STATES PATENTS

| Number | Name | Date |
|---|---|---|
| 693,418 | Montgomery | Feb. 18, 1902 |
| 772,498 | Chapman et al. | Oct. 18, 1904 |
| 2,003,658 | Thomas | June 4, 1935 |
| 2,078,682 | Par et al. | Apr. 27, 1937 |
| 2,101,770 | Wolfe | Dec. 7, 1937 |
| 2,137,884 | Weeks | Nov. 22, 1938 |
| 2,269,956 | Renner | Jan. 13, 1942 |
| 2,370,096 | Walder et al. | Feb. 20, 1945 |

FOREIGN PATENTS

| Number | Country | Date |
|---|---|---|
| 637,128 | France | Jan. 24, 1928 |
| 508,626 | Great Britain | July 4, 1939 |

Certificate of Correction

Patent No. 2,506,013                                          May 2, 1950

JOHN C. COLUMBUS

It is hereby certified that errors appear in the printed specification of the above numbered patent requiring correction as follows:

Column 10, line 65, for the words "beverage making" read *beverage-making*; column 11, line 38, for "verted" read *inverted*;

and that the said Letters Patent should be read with these corrections therein that the same may conform to the record of the case in the Patent Office.

Signed and sealed this 5th day of September, A. D. 1950.

[SEAL]

THOMAS F. MURPHY,
*Assistant Commissioner of Patents.*